Jan. 10, 1950   R. A. C. ANDREWS   2,493,846
MAGNETIC SADIRON HOLDER
Filed Jan. 22, 1948   2 Sheets-Sheet 1

Inventor

Robert A. C. Andrews

By Clarence A. O'Brien
and Harvey B. Jacobson
Attorneys

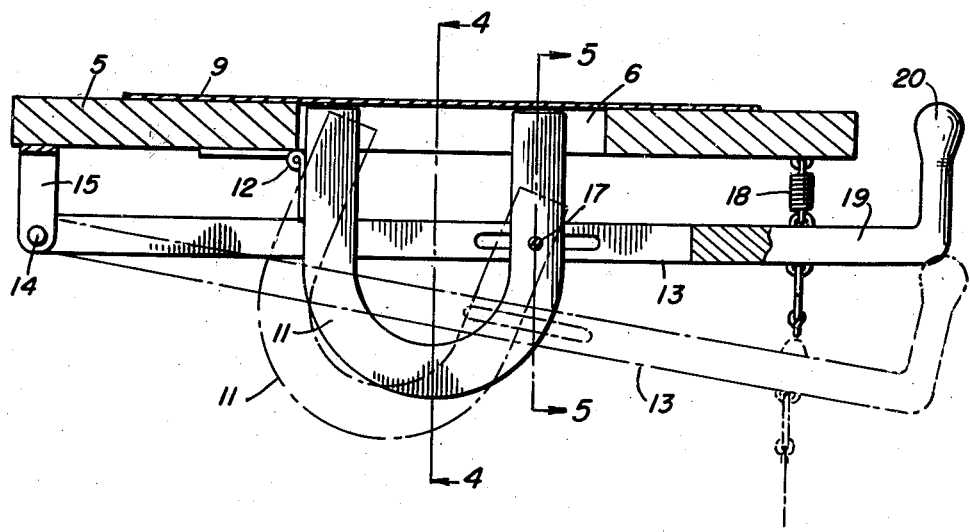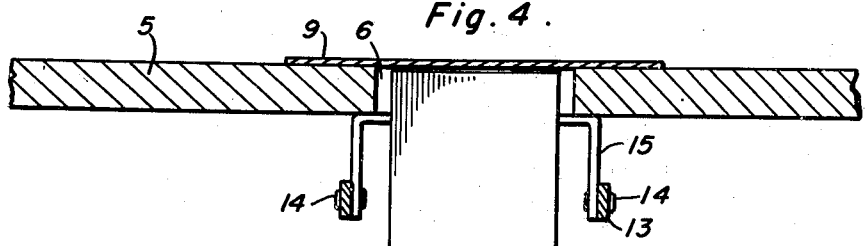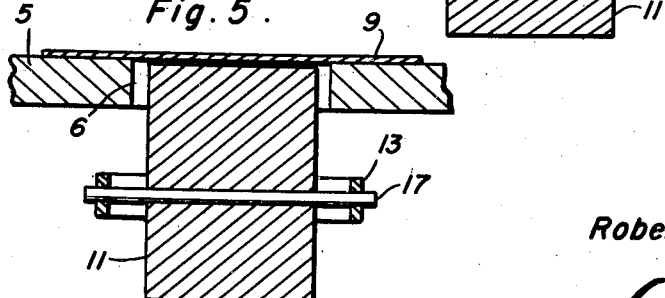

Patented Jan. 10, 1950

2,493,846

UNITED STATES PATENT OFFICE 2,493,846

MAGNETIC SADIRON HOLDER

Robert A. C. Andrews, St. Thomas, Ontario, Canada

Application January 22, 1948, Serial No. 3,737

6 Claims. (Cl. 38—107)

This invention relates to ironing boards and ironing tables, and has more particular reference to a magnetic sad-iron holder for an ironing board or table.

The primary object of the invention is to provide a magnetic holder for a heated sad-iron, which is associated with an ordinary ironing board to receive the sad-iron and hold it reliably against lateral displacement.

A further object of the invention is to provide a magnetic holder by means of which a sad-iron is held against lateral displacement by magnetic force, the device including means whereby the sad-iron may be released through the shifting of the permanent magnet of the holder to a non-working position.

A further object of the invention is to provide a magnetic sad-iron holder including hand and/or foot operated means for shifting the permanent magnet to a non-working position so as to release the sad-iron, yieldable means being provided to normally hold the permanent magnet in a working position.

Still another object of the invention is to provide a magnetic sad-iron holder which is simple in construction, efficient in operation, and easy to install and use.

Other objects and features of the invention will become apparent from the following description when considered in connection with the accompanying drawings, in which:

Figure 2 is an enlarged transverse section taken substantially on the line 2—2 of Figure 1.

Figure 4 is a vertical section taken on line 4—4 of Figure 2.

Figure 5 is a vertical section taken on line 5—5 of Figure 2.

Figures 1, 3:
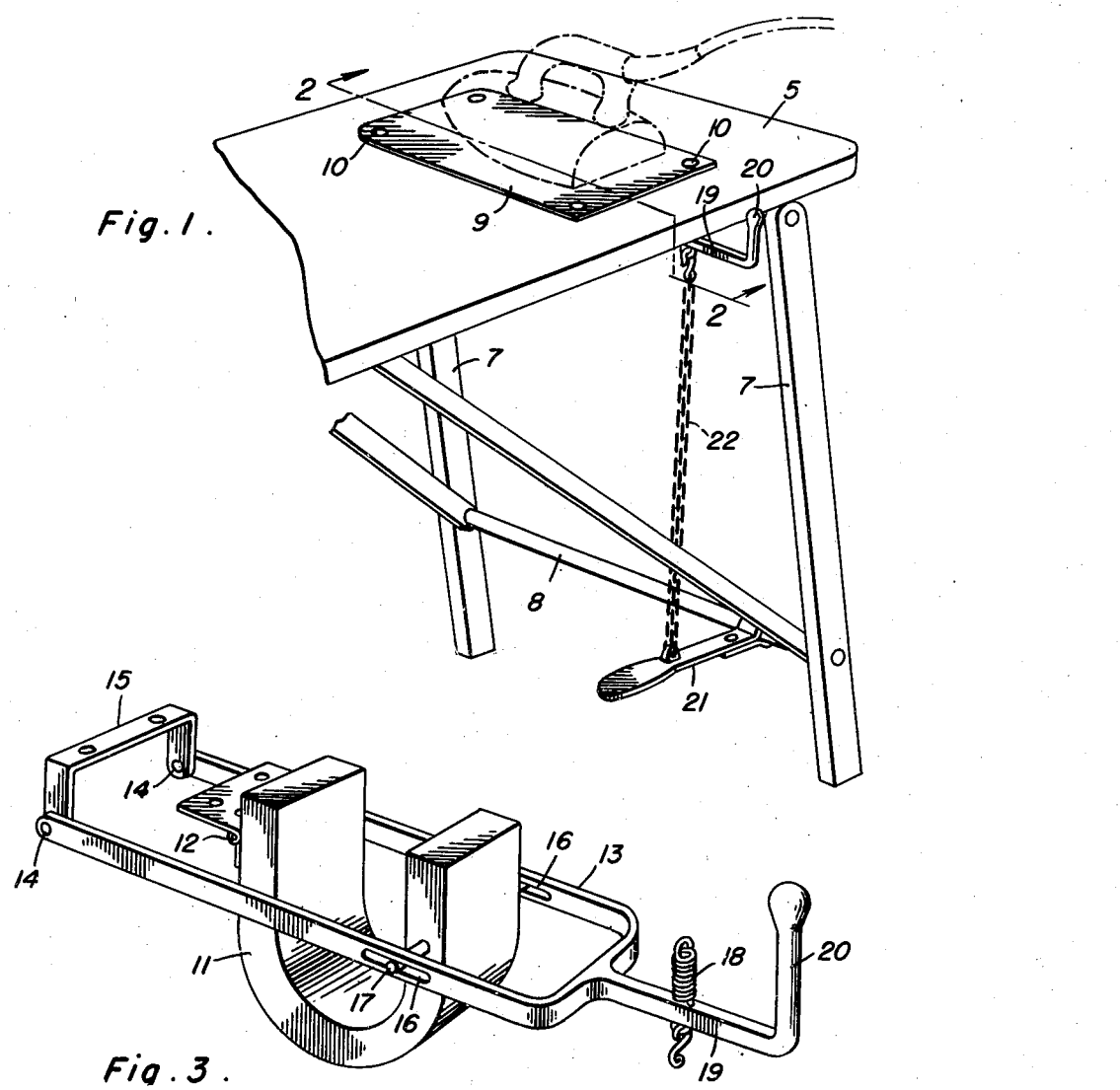
Figure 1 is a fragmentary perspective view of an ironing board equipped with a magnetic sad-iron holder constructed in accordance with the present invention.
Figure 3 is a perspective view of the construction shown in Figure 2, with the ironing board and holder plate omitted.

Referring in detail to the drawings, an embodiment of the invention is shown applied to an ironing table which includes an ordinary ironing board 5 having an aperture 6 near one end, and spaced legs 7 supporting the board 5 at said end and connected near their lower ends by a transverse rung 8.

As shown, a flat plate 9 of magnetic material is secured on the board 5 so as to cover the aperture 6, as by means of screws 10. A horseshoe or equivalent permanent magnet 11 is disposed beneath the holder plate 9 with the ends thereof directed toward said plate 9. Supporting means is provided to facilitate vertical movement of the magnet 11 relative to the plate 9 between a raised working position as shown by full lines in Figure 2 and a lowered non-working position as indicated by dotted lines in the same figure. The illustrated supporting means includes a hinge 12 having one leaf attached to an end portion of the magnet 11 and another leaf attached to the underside of the ironing board 5 at one end of the aperture 6, whereby the magnet 11 is mounted for vertical swinging movement to a raised working position with both of its ends positioned within the aperture 6 and in close proximity to the bottom face of the plate 9, or to a lowered nonworking position with one of its ends sufficiently lowered so that the plate 9 is out of the path of the magnetic flux flowing between the poles of the magnet. The plate 9 is made of a suitable material which will not become permanently magnetized, and it will thus be apparent that when a sad-iron is placed upon the plate 9 as indicated by dotted lines in Figure 1 and the magnet 11 is raised to the full line position of Figure 2, the flux will become effective to hold the sad-iron, which is made of magnetic material, against lateral displacement. On the other hand, when the magnet 11 is lowered to the dotted line position of Figure 2, the flux is ineffective so that the sad-iron is released and may be freely removed from the holder plate 9. The supporting means further includes a vertically swinging elongated yoke 13 having its ends pivoted at 14 to a bracket 15 secured to the underside of the ironing board 5 at the same side of the aperture 6 as that at which the hinge 12 is disposed, but at a point removed from said aperture. The legs of the yoke 13 are provided with transversely aligned longitudinal slots 16 in which are slidably engaged the projecting ends of a transverse pin 17 secured to and extended through the non-hinged end portion of the magnet 11. It will be noted that the pivots at 14 are on a plane below the pivot of the hinge 12, and the pin 17 is disposed a correspondingly greater distance from the end of the associated leg of magnet 11 as compared to the pivot of hinge 12. Thus, the yoke 13 is substantially horizontal or parallel with the board 5 when the magnet is in working position. An elastic element or tension spring 18 normally holds the yoke 13 elevated with the magnet 11 in working position, and this spring is attached at one end to the underside of the board 5 and at the other end to a longitudinal arm 19 rigid with the intermediate portion or closed end of yoke 13. An upwardly directed handle 20 may be provided on the outer end of arm 19 for use in manually forcing the yoke 13 downwardly against the action of spring 18 to move the magnet 11 to its lowered non-working position.

In order to enable the user to move the magnet 11 to non-working position by foot operation when found necessary or desirable, a pedal 21 may be pivoted on the rung 8 and operatively connected to the yoke 13 by means of a chain or other link connection 22 having one end attached to the arm 19 and its other end attached to the pedal 21 between the ends of the latter. Obviously, either the handle 20 or the pedal 21 and connection 22 may be omitted if desired. By hanging the magnet 11 at 12 and providing the pin and slot connection 16, 17 between the magnet 11 and the yoke 13, an accelerated movement of the magnet is effected so that relatively short movement of yoke 13 effects a greater movement of the magnet 11. This provides for quick release of the sad-iron.

From the foregoing description, it is believed that the construction and operation, as well as the advantages of the present invention, will be readily understood and appreciated by those skilled in the art. Modifications and changes in details of construction are contemplated, such as fall within the scope of the invention as claimed.

I claim as my invention:

1. The combination with an ironing board having an aperture near one end, of a magnetic sad-iron holder including a holder plate of magnetic material secured on said board and covering said aperture, a permanent magnet yieldingly supported in a working position beneath said holder plate, and means to move said magnet downwardly relative to said plate to a non-working position.

2. The combination with an ironing board having an aperture near one end, of a magnetic sad-iron holder including a holder plate of magnetic material secured on said board and covering said aperture, a permanent magnet supported for vertical movement beneath said holder plate, means to raise said magnet to a working position relative to said plate, and means to lower said magnet relative to said plate to a non-working position.

3. The construction defined in claim 2, wherein said supporting means includes a hinge connection between the ironing board and one end portion of the magnet, a yoke pivoted beneath the ironing board and straddling the magnet, and a pin and slot connection between said yoke and the other end portion of said magnet.

4. The construction defined in claim 2, wherein said supporting means includes a hinge connection between the ironing board and one end portion of the magnet, a yoke pivoted beneath the ironing board and straddling the magnet, and a pin and slot connection between said yoke and the other end portion of said magnet, and a handle on one end of the yoke projecting upwardly at one side of the ironing board.

5. The construction defined in claim 2, wherein said supporting means includes a hinge connection between the ironing board and one end portion of the magnet, a yoke pivoted beneath the ironing board and straddling the magnet, and a pin and slot connection between said yoke and the other end portion of said magnet, and an elastic element connecting the yoke with the ironing board to normally position the magnet in working position.

6. The combination with an ironing table including an ironing board having an aperture near one end, and spaced legs supporting said board at said end and connected near their lower ends by a transverse rung, of a magnetic sad-iron holder including a holder plate of magnetic material secured on said board and covering said aperture, a permanent magnet disposed beneath said holder plate with the ends thereof directed toward said plate, supporting means to facilitate vertical movement of said magnet relative to said plate between a raised working position and a lowered non-working position, yieldable means to normally hold the magnet in its raised working position, and foot operated means including a foot pedal pivoted on said rung for depressing the magnet to its lowered non-working position.

ROBERT A. C. ANDREWS.

REFERENCES CITED

The following references are of record in the file of this patent:

UNITED STATES PATENTS

| Number | Name | Date |
|--------|------|------|
| 949,351 | Clayton | Feb. 15, 1910 |
| 1,555,169 | Todd | Sept. 29, 1925 |